United States Patent [19]
Aoyama et al.

[11] Patent Number: 5,564,466
[45] Date of Patent: Oct. 15, 1996

[54] NEGATIVE PRESSURE CUT VALVE

[75] Inventors: Taiki Aoyama, Fujisawa; Kouichi Katoh, Hiroshima; Harumitsu Sugiyama, Naka-gun; Shinichi Matsuo, Yokohama; Nobuhiro Hirata, Sagamihara, all of Japan

[73] Assignees: Piolax, Inc.; Nissan Motor Co., Ltd., both of Yokohama, Japan

[21] Appl. No.: 565,099

[22] Filed: Nov. 30, 1995

[30] Foreign Application Priority Data

Nov. 30, 1994 [JP] Japan ................... 6-321469

[51] Int. Cl.$^6$ .................... F02M 33/02; F16K 17/26
[52] U.S. Cl. ........................ 137/493.8; 123/518
[58] Field of Search ................. 137/493.8, 907, 137/494, 496; 123/516, 518, 519, 520

[56] References Cited

U.S. PATENT DOCUMENTS

| | | | |
|---|---|---|---|
| 4,391,294 | 7/1983 | Aubel | 137/907 |
| 5,090,393 | 2/1992 | Holch | 137/907 |
| 5,188,141 | 2/1993 | Cook et al. | 137/907 |

FOREIGN PATENT DOCUMENTS 1-126824  8/1989  Japan .

Primary Examiner—Thomas N. Moulis
Attorney, Agent, or Firm—Wenderoth, Lind & Ponack

[57] ABSTRACT

A negative pressure cut valve disposed between a feed pipe and a forward pipe includes a main body having a first outer wall and a second outer wall, an urging spring provided on the first outer wall, a diaphragm provided on the main body and actuated by the relative action of the force of the urging spring and the inner pressure on the feed pipe side to produce an opening action in the state in which the inner pressure on the feed pipe side rises is above the inner pressure on the forward pipe side and a closing action in the other pressure state, and a valve provided on the main body and actuated to produce an opening action in the state in which the inner pressure on the feed pipe side falls below the inner pressure on the forward pipe side and a closing action in the other pressure state. The first outer wall has a first atmospheric vent formed therein. The second outer wall is disposed around the periphery of the first atmospheric vent and enabled jointly with the first outer wall to define an empty space for precluding intrusion of extraneous substances. The empty space has a capacity at least above an operating capacity of the diaphragm. The second outer wall has a second atmospheric vent formed therein and endowed with a function of releasing pressure and a function of discharging water.

14 Claims, 5 Drawing Sheets

NEGATIVE PRESSURE CUT VALVE

BACKGROUND OF THE INVENTION

1. Field of the Invention

This invention relates to a negative pressure cut valve for use at a site liable to be invaded by water, more particularly to a diaphragm type negative pressure cut valve to be ideally used in a leakproof system for vaporized fuel in an automobile fuel tank.

2. Description of the Prior Art

In the injection of fuel into an automobile fuel tank, the air containing vaporized fuel is apt to leak from the interior of the fuel tank into the ambient air. For the purpose of preventing the leakage of the vaporized fuel into the ambient air, the vapor recovery system such as is disclosed in JP-A-01-126,824, for example, has been developed to date.

This system is adapted to cause the vaporized fuel arising during the injection of fuel to be adsorbed on a canister and, after the engine is started, enable the vaporized fuel in the canister to be effectively utilized for the ensuing operation of the started engine. The adoption of this system, however, requires the capacity of the canister to be larger than usual for the sake of the adsorption of the vaporized fuel.

To ensure the earliest possible consumption of the adsorbed vaporized fuel and enable the canister to resume the function of adsorption for full utilization, the flow volume of the vaporized fuel to be purged from the engine must be increased.

In this case, however, there arises the possibility that the interior of the fuel tank will develop a negative pressure and the fuel tank will succumb to deformation under compression, depending on the flow volume of the vaporized fuel being purged. Means to preclude this possibility, therefore, is needed.

It has been heretofore proposed, therefore, to provide such a diaphragm type negative pressure cut valve 50 as shown in FIG. 9 inside such a vapor recovery system S as shown in FIG. 8, for example.

In FIG. 8, reference numeral 51 stands for a fuel tank, numeral 52 for a filler tube for establishing communication between a fuel inlet and the fuel tank 51, numeral 53 for a canister, numeral 54 for an evaporation shutting valve, numeral 55 for a shutter on the side of the fuel inlet, numeral 56 for a backflow preventing shutter, numeral 57 for a cut valve, numeral 58 for a fuel temperature sensor, numeral 59 for a bypass valve, numeral 60 for a pressure sensor, numeral 61 for a drain cut valve, numeral 62 for a one-way valve, numeral 63 for a duckbill, and numeral 64 for a piping extending from the fuel tank 51 via the evaporation shutting valve 54 to the canister 53.

In FIG. 9, reference numeral 65 stands for a diaphragm, numeral 66 for a compression coil spring, numeral 67 for a flexible umbrellalike valve, numeral 69 for a lower side wall of the cut valve 50 provided with an atmospheric vent 68, numeral 71 for a feed pipe, and numeral 81 for a forward pipe.

The negative pressure cut valve 50, therefore, is arranged in parallel to the bypass valve 59 disposed on the piping 64. The piping 64 has the pressure sensor 60 incorporated therein before it reaches the canister 53.

Now, the operation of the prior art negative pressure cut valve 50 constructed as described above will be explained below. With reference to FIG. 8 and FIG. 9, while the canister 53 is under a reduced pressure, both the diaphragm 65 and the umbrellalike valve 67 retain their shut states to prevent the interior of the fuel tank 51 from assuming negative pressure.

When fuel is injected into the fuel tank 51 and the inner pressure of the fuel tank 51 is consequently increased, the diaphragm 65 assumes its open state to release the pressure toward the canister 53 at the time that the difference of pressure between the feed pipe 71 side and the forward pipe 81 side overcomes the pressure of the compression coil spring 66. When the inner pressure of the fuel tank 51 is conversely lowered, the difference of pressure between the feed pipe 71 side and the forward pipe 81 side sets the umbrellalike valve 67 at its open state to start inflow of the ambient air from the canister 53 side.

For the purpose of enabling the diaphragm 65 to operate smoothly under the conventional negative pressure cut valve 50, therefore, the atmospheric vent 68 must be formed on the operating side of the diaphragm 65, namely on the lower side wall 69 of the cut valve 50 as shown in FIG. 9.

The fact that the atmospheric vent 68 is formed in the lower side wall 69 mentioned above, however, suggests the possibility that the atmospheric vent 68 will admit dirt and other extraneous substances and these intruders will obstruct the operation of the diaphragm 65. It has been, therefore, customary to adopt means to decrease the size of the atmospheric vent 68 to the fullest possible extent. If this decrease is made excessively, however, the vent 68 will operate adversely and cease to ensure smooth operation of the diaphragm 65.

When the vapor recovery system S is mounted on an automobile, it entrains the following problems, depending on the position for laying out the negative pressure cut valve 50.

Since the negative pressure cut valve 50 by nature must be disposed at a position near the fuel tank 51, it is generally installed more often than not in the neighborhood of the rear side. At the position thus selected, it is naturally prone to the influences of water and mud. Particularly when the automobile happens to run into a pool of water on a road, the possibility that the negative pressure cut valve 50 will plunge completely in the water is quite fair. If the diaphragm 65 is operated while the negative pressure cut valve 50 remains in the submerged state, the water will find its way through the atmospheric vent 68 and adhere to the diaphragm 65 and compression coil spring 66.

The dirty water deteriorates the diaphragm 65 and compression coil spring 66. If the adhering water freezes, the possibility that the diaphragm 65 itself will no longer be able to operate cannot be denied.

The main object of this invention is to provide a negative pressure cut valve which allows an effective solution of such problems of the prior art as mentioned above and, in particular, permits infallible prevention of the aforementioned adhesion of water and extraneous substances to a diaphragm and a compression coil spring without exerting any adverse effect on the necessary performance of the valve.

SUMMARY OF THE INVENTION

To accomplish this object, according to one aspect of the present invention there is provided a negative pressure cut valve disposed between a feed pipe and a forward pipe and comprising a main body having a first outer wall and a second outer wall, urging spring means provided on the first outer wall, a diaphragm provided on the main body and actuated by a relative action of a force of the urging spring means and an inner pressure on a side of the feed pipe to produce an opening action in a state in which the inner pressure on the feed pipe side rises above an inner pressure on a side of the forward pipe and a closing action in other pressure state, and valve means provided on the main body and actuated to produce an opening action in a state in which the inner pressure on the feed pipe side falls below the inner pressure on the forward pipe side and a closing action in other pressure state, the first outer wall having a first atmospheric vent formed therein, the second outer wall being disposed around a periphery of the first atmospheric vent and enabled jointly with the first outer wall to define an empty space for precluding intrusion of extraneous substances, the empty space having a capacity at least above an operating capacity of the diaphragm, the second outer wall having a second atmospheric vent formed therein and endowed with a function of releasing pressure and a function of discharging water.

According to the second aspect of the present invention, there is provided a negative pressure cut valve further comprising an elastically deformable elastic member disposed inside the empty space for dividing the empty space into a first empty space on the first atmospheric vent side and a second empty space on the second atmospheric vent side.

According to the third aspect of the present invention, there is provided a negative pressure cut having, in place of the elastically deformable elastic member, a gas-liquid separating membrane for separating the empty space into a first empty space on the first atmospheric vent side and a second empty space on the second atmospheric vent side.

The above and other objects, features and advantages of this invention will become apparent from the following detailed description to be given with reference to the accompanying drawings.

DETAILED DESCRIPTION OF THE PREFERRED EMBODIMENTS

Figure 1:
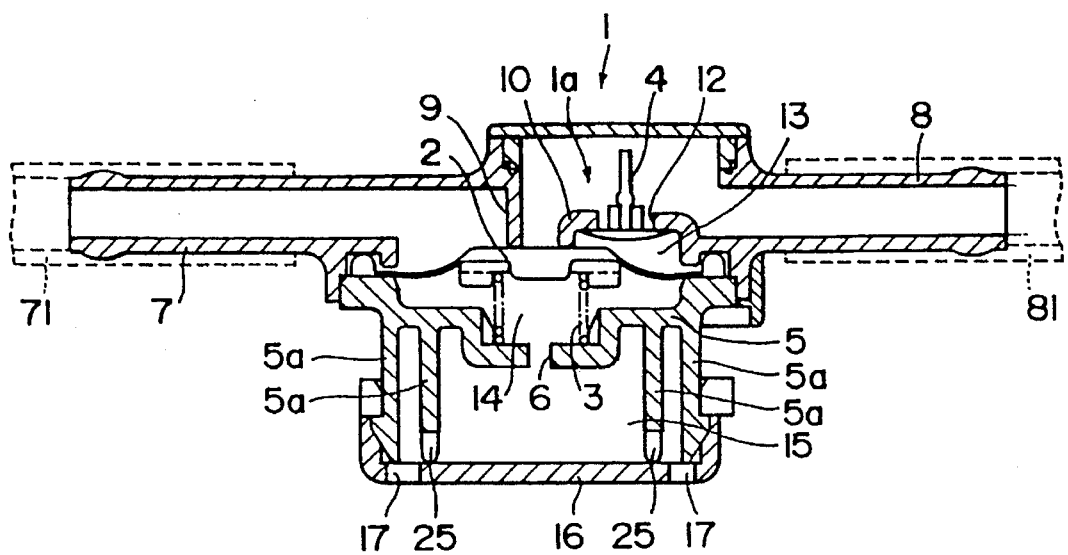
FIG. 1 is cross section showing the essential part of a negative pressure cut valve according to the first preferred embodiment of this invention.

Now, this invention will be described in detail below with reference to the preferred embodiments shown in the drawings.

As shown in FIG. 1, a negative pressure cut valve 1 according to the first preferred embodiment comprises main body 1a having a first outer wall 5 formed therein with a first atmospheric vent 6 and a second outer wall 16, a diaphragm 2, a compression coil spring 3, a flexible umbrellalike valve 4, a first connecting pipe 7 for a feed pipe 71, and a second connecting pipe 8 for a forward pipe 81.

In these components, the diaphragm 2 is urged by the prescribed pressure of the compression coil spring 3 and, in the normal state, pressed against the terminal parts of a first partition wall 9 and a second partition wall 10 which both project into the main body 1a, and consequently caused to assume a shut state capable of closing a first path 11 (FIG. 3) which will be specifically described hereinbelow. The diaphragm 2, when actuated to produce an opening action, establishes communication between the feed pipe 71 and the forward pipe 81.

The diaphragm 2, therefore, is actuated by the relative action between the force of the compression coil spring 3 and the inner pressure on the supply pipe 71 side to produce an opening action against the pressure of the compression coil spring 3 when the inner pressure on the feed pipe 71 side rises by a prescribed pressure above the inner pressure on the forward pipe 81 side or assume a shut state under the pressure of the compression coil spring 3 when the inner pressure is in the other state.

The umbrellalike valve 4 in the normal state assumes shut state capable of closing a passage hole 12 formed on the second partition wall 10. When this umbrellalike valve 4 produces an opening action, it opens the passage hole 12. It, therefore, produces the opening action when the inner pressure on the supply pipe 71 side falls below the inner pressure on the forward pipe 81 side and assumes the shut state when the inner pressure is in the other state.

The first atmospheric vent 6 is formed on the bottom part of the first outer wall 5 and adapted to introduce or discharge air into or out of an operating empty space 14 of the diaphragm 2 which is defined by the first outer wall 5 and the diaphragm 2.

The negative pressure cut valve 1 of the first embodiment has the construction described above and is characterized in that the second outer wall 16 is disposed in a watertight state around the periphery of the first atmospheric vent 6 and enabled jointly with the first outer wall 5 to positively define an empty space 15 for precluding intrusion of water, dirt, etc.

To be more specific, a pair of vertical walls 5a assuming an inner-outer double-wall structure is disposed on the lower side of the bottom part of the first outer wall 5 and, meanwhile, the second outer wall 16 is disposed on the lower level side of the first atmospheric vent 6 in such a manner as shown in FIG. 1 that the terminal part of the second outer wall 16 and the terminal part of the vertical wall 5a on the outer side are joined in a watertight state, that the second outer wall 16 and the first outer wall 5 define the empty space 15 for precluding the intrusion of water, dirt, etc., and that the capacity of the empty space 15 for precluding the intrusion, precisely the capacity above the upper terminal parts of communicating holes 25 formed in the vertical wall 5a on the inner side, is set at least above the operating capacity of the diaphragm 2.

The expression "operating capacity of the diaphragm 2" as used herein refers to the volume of the air to be introduced or discharged during the interval between the time the diaphragm 2 assumes the shut state and the time it assumes the largest open state.

Besides, two second atmospheric vents 17 endowed with a function of releasing pressure and a function of discharging water are formed in the bottom part of the second outer wall 16. The second atmospheric vents 17 are made to communicate with the first atmospheric vent 6 via the communicating hole 25s which are formed in the lower terminal parts of the inner vertical wall 5a of the two vertical walls disposed on the first outer wall 5 side.

Figure 8:
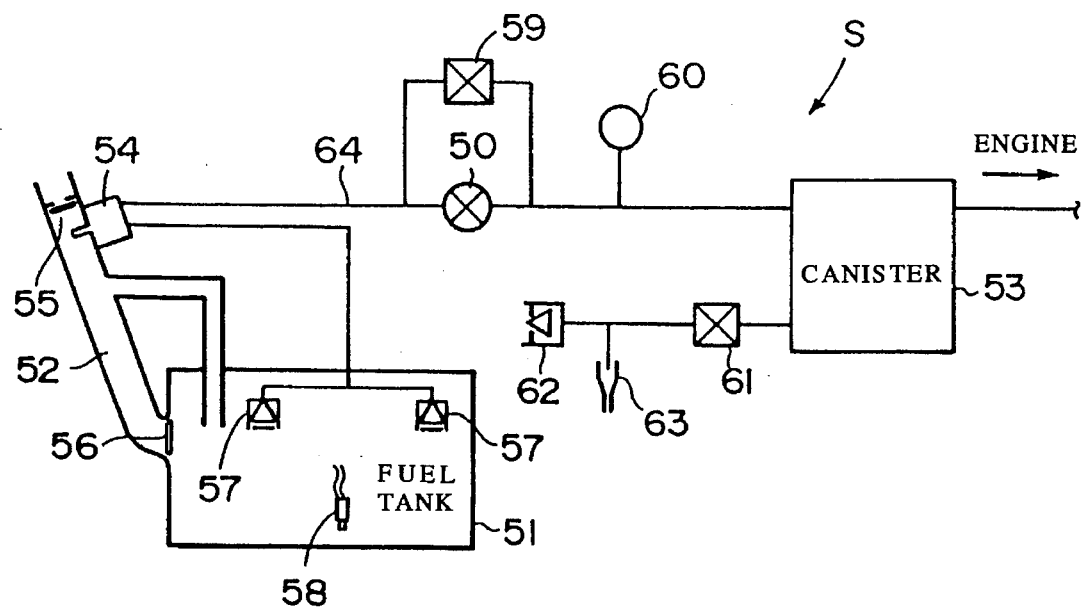
FIG. 8 is n explanatory diagram showing one example of a prior art negative pressure cut valve disposed in an automobile vapor recovery system.
Figure 9:
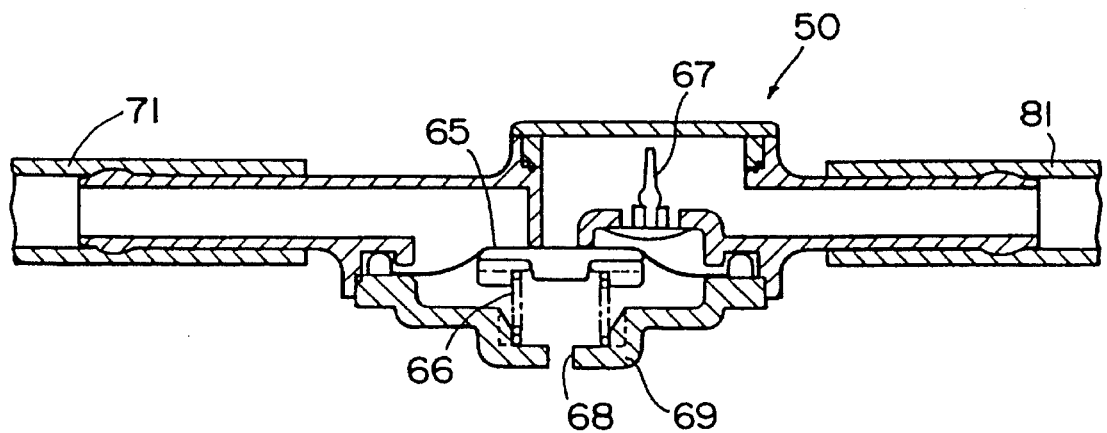
FIG. 9 is cross section showing the essential part of the prior art negative pressure cut valve.

Incidentally, the negative pressure cut valve 1 of this embodiment, similarly to the conventional countertype described above, is intended to be disposed in the vapor recovery system S shown in FIG. 8. It is, therefore, arranged in parallel to the bypass valve 59 disposed on the piping 64 which extends from the fuel tank 51 via the evaporation shutting valve 54 to the canister 53.

Now, the operation of the negative pressure cut valve 1 of the first embodiment will be described below.

Figure 2:
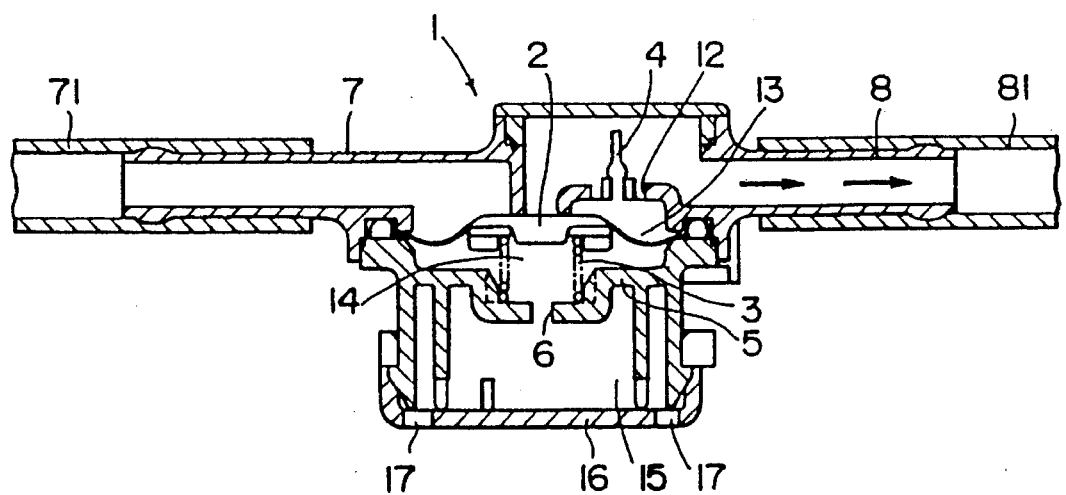
FIG. 2 is cross section showing the essential part of an operating condition of the negative pressure cut valve.

FIG. 2 shows the state of the negative pressure cut valve 1 assumed when the canister 53 is held under a reduced pressure. While the canister 53 is under a reduced pressure, the diaphragm 2 is kept in a shut state under the pressure of the compression coil spring 3 and the umbrellalike valve 4 is likewise kept in a shut state owing to the state of negative pressure on the forward pipe 81 side. As a result, the feed pipe 71 side and the forward pipe 81 side are shut off each other and the fuel tank 51 is made to develop negative pressure therein and prevented from succumbing to compressive deformation.

Figure 3:
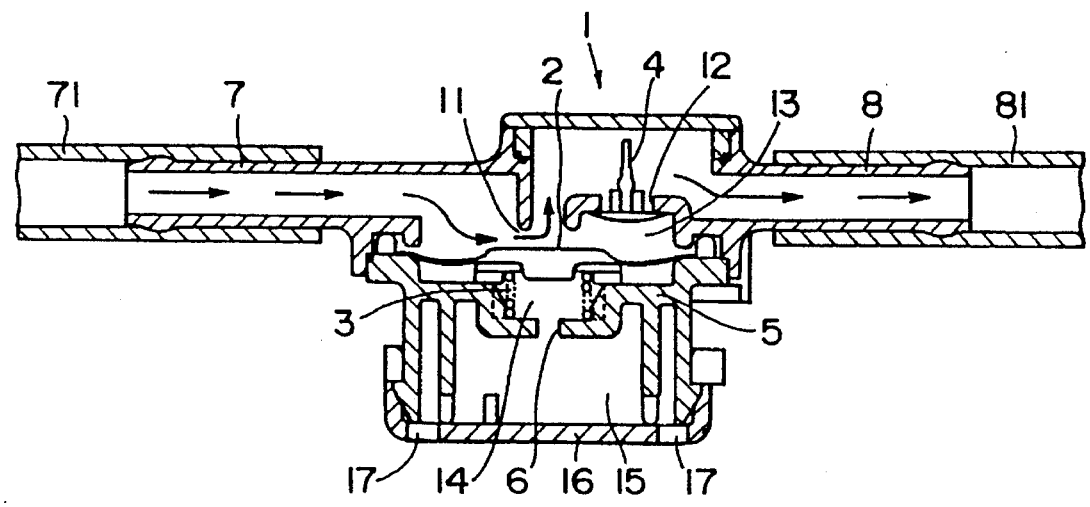
FIG. 3 is cross section showing the essential part of another operating condition of the negative pressure cut valve.

FIG. 3 shows the state of the negative pressure cut valve 1 assumed when the inner pressure of the fuel tank 51 increases. When the difference of pressure between the feed pipe 71 side and the forward pipe 81 side (the larger pressure on the feed pipe 71 side) overcomes the pressure of the compression coil spring 3 while the fuel tank 51 is under the state mentioned above, the diaphragm 2 assumes an open state to open the first path 11 and release pressure from the feed pipe 71 side (the fuel tank 51 side) to the forward pipe 81 side (the canister 53 side) and, accordingly, forward the vaporized fuel to the canister 53 as indicated by an arrow in FIG. 3.

Figure 4:
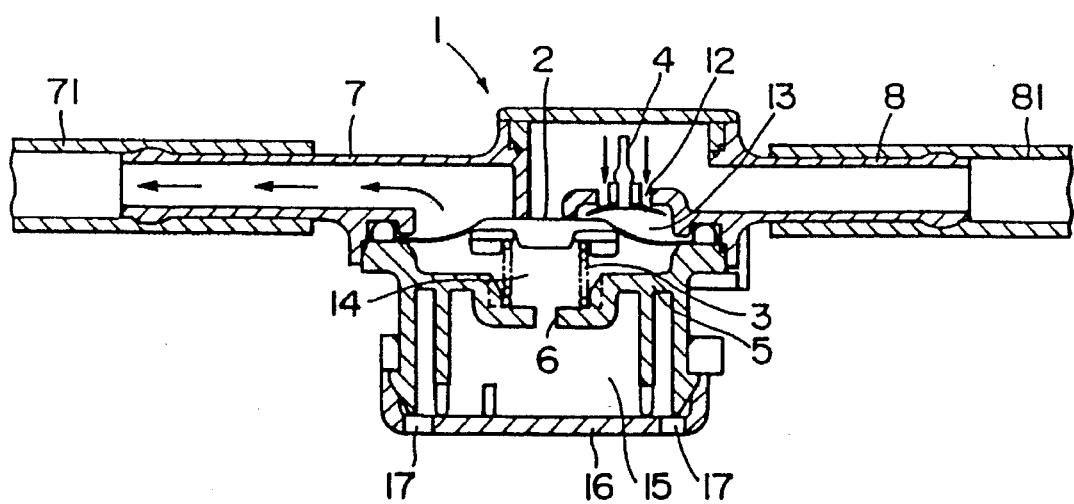
FIG. 4 is cross section showing the essential part of still another operating condition of the negative pressure cut valve.

FIG. 4 shows the state of the a negative pressure cut valve 1 assumed when the inner volume of the fuel tank 51 decreases. While the fuel tank 51 is in this state, the difference of pressure between the feed pipe 71 side and the forward pipe 81 side (the larger pressure on the forward pipe 81 side) sets the umbrellalike valve 4 at an open state and induces inflow of the air from the canister 53 side via the forward pipe 81, the passage hole 12, a communicating empty space 13 and the feed pipe 71 to the fuel tank 51 side as indicated by an arrow in FIG. 4.

In the negative pressure cut valve 1 of the first embodiment, therefore, the operating empty space 14 of the diaphragm 2 assumes a negative pressure when the diaphragm 2 is shifted from the open state shown in FIG. 3 to the shut state shown in FIG. 2.

When an automobile carrying the negative pressure cut valve 1 happens to run into a pool of water on a road and the negative pressure cut valve 1 disposed in the neighborhood of the rear side close to the fuel tank 51 submerges under the water and the water, dirt, etc. find their way through the second atmospheric vents 17 of the second outer wall 16 into the negative pressure cut valve 1, these extraneous substances remain only within the empty space 15 for precluding intrusion at all because the capacity of the empty space 15 for precluding intrusion is set at least above the operating capacity of the diaphragm 2 as already described. The possibility of these extraneous substances finding their way through the first atmospheric vent 6 into the operating empty space 14 of the diaphragm 2 as witnessed in the prior art countertype can be effectively precluded.

When the difference of pressure mentioned above ceases to exist, the extraneous substances which have entered the empty space 15 for precluding intrusion are infallibly discharged outside through the second atmospheric vents 17 formed in the second outer wall 16 and are not suffered to remain for any length of time in the empty space 15 for precluding intrusion.

Since the adhesion of such extraneous substances as water and dirt to the diaphragm 2 and the compression coil spring 3, therefore, can be effectively prevented, the possibility of the diaphragm 2 producing a defective operation because of the entry of the extraneous substances as witnessed in the prior art countertype is completely eliminated.

Now, the negative pressure cut valve 1 according to the second and the third embodiments will be described in detail below with reference to FIG. 5 and FIG. 6. In these diagrams, like component elements shown in the first embodiment are denoted by like reference numerals and are omitted from the following description.

Since the negative pressure cut valve 1 of the second or third embodiment basically adopts the construction of the first embodiment mentioned above, it is so constructed that the second outer wall 16 is disposed in a watertight state around the periphery of the first atmospheric vent 6, that the second outer wall 16 and the first outer wall 5 define the empty space 15 for precluding intrusion of water, dirt, etc., that the capacity of the empty space 15 for precluding intrusion is set above the operating capacity of the diaphragm 2, and that the second atmospheric vents 17 endowed with a function of releasing pressure and a function of discharging water are formed in the bottom part of the second outer wall 16. As concerns the number of the second atmospheric vents 17, these vents formed at four places in the second embodiment and at two places in the third embodiment.

The second and third embodiment is are characterized in that an elastically deformable elastic member 20 for separating the empty space 15 for precluding the intrusion as kept intact in a watertight state into a first empty space 18 on the first atmospheric vent 6 side and a second empty space 19 on the second atmospheric vent 17 side is disposed inside the empty space 15 for precluding the intrusion.

The elastic member 20 is formed of rubber, soft resin made of vinyl chloride or polyethylene, coated anon-woven fabric, or elastomer.

Figure 5:
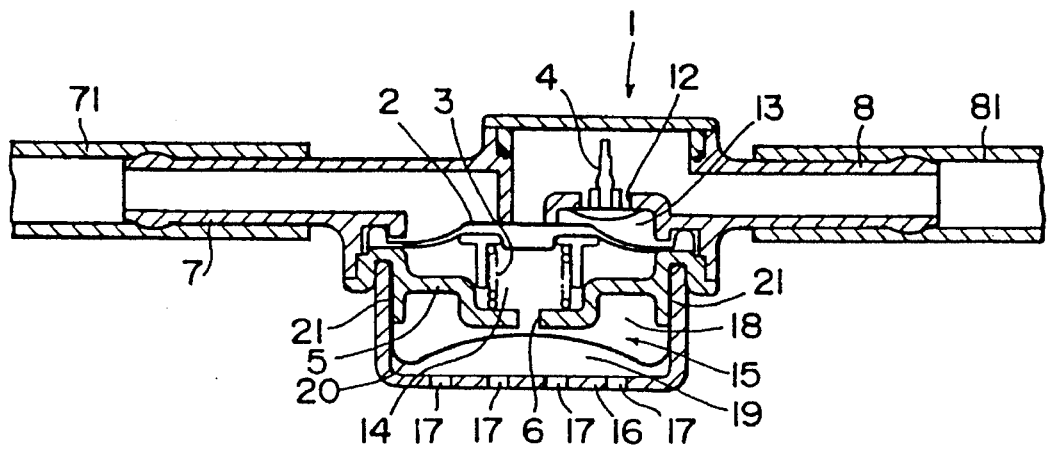
FIG. 5 is cross section showing the essential part of a negative pressure cut valve according to the second preferred embodiment of this invention.

To be specific, the elastic member 20 used in the second embodiment is formed in the shape of a membrane which is adapted to separate the first empty space 18 and the second empty space 19 from each other and provided with a peripheral part fit to be nipped in the joint between the first outer wall 5 and the second outer wall 16 as shown in FIG. 5.

The basic operation of the second embodiment, therefore, is like that of the first embodiment described above. In the second embodiment, however, the elastic member 20 of the shape of a membrane is elastically deformed in the direction of the bottom part of the second outer wall 16 under the positive pressure on the operating empty space 14 side when the diaphragm 2 is shifted from the shut state to the open state and this membranous elastic member 20 is elastically deformed in the direction of the first atmospheric vent 6 under the negative pressure on the operating empty space 14 side when the diaphragm 2 is shifted from the open state to the shut state.

Figure 6:
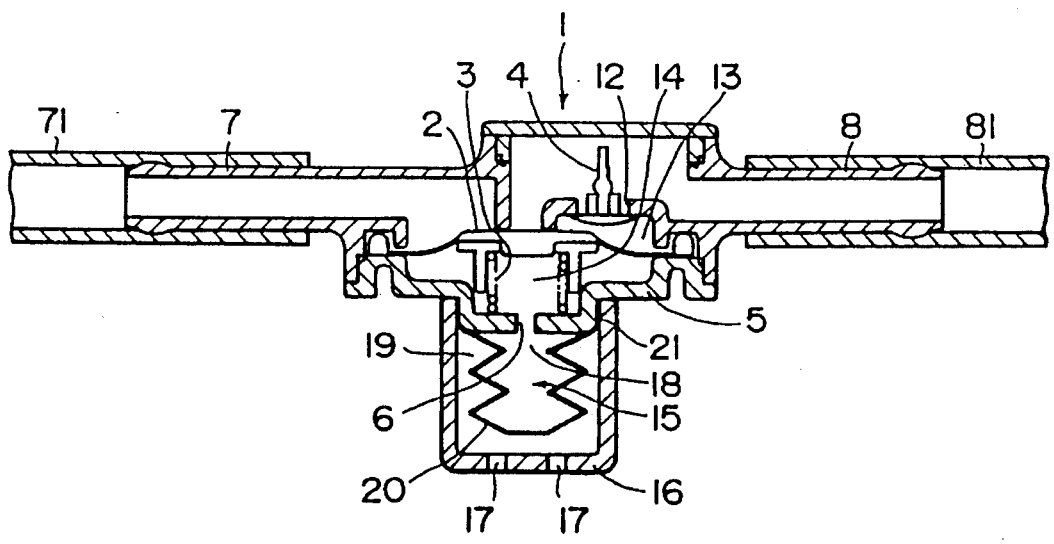
FIG. 6 is cross section showing the essential part of a negative pressure cut valve according to the third preferred embodiment of this invention.

On the other hand, the elastic member 20 in the third embodiment is formed in the shape of an expandable bellows which is adapted to separate the first empty space 18 and the second empty space 19 from each other and provided with a peripheral part fit to be nipped in the joint between the first outer wall 5 and the second outer wall 16 as shown in FIG. 6.

The expandable elastic member 20 in the third embodiment, therefore, is elastically deformed with an elongation of the length thereof in the direction of the bottom part of the second outer wall 16 under the positive pressure of the operating empty space 14 side when the diaphragm 2 is shifted from the shut state to the open state. This expandable elastic member 20 is deformed with a decrease of the length thereof in the direction of the first atmospheric vent 6 under the negative pressure on the operating empty space 14 side.

In the second and the third embodiments, particularly since the empty space 15 for precluding intrusion is separated by the elastic member 20 as kept intact in the watertight state into the first empty space 18 on the first atmospheric vent 6 side and the second empty space 19 on the second atmospheric vent 17 side, water, dirt, etc. which happen to enter the second empty space 19 are intercepted by the elastic member 20 and prevented from entering the first empty space 18. Thus, the adhesion of these extraneous substances to the diaphragm 2 and the compression coil spring 3 can be prevented with further exalted infallibility.

Figure 7:
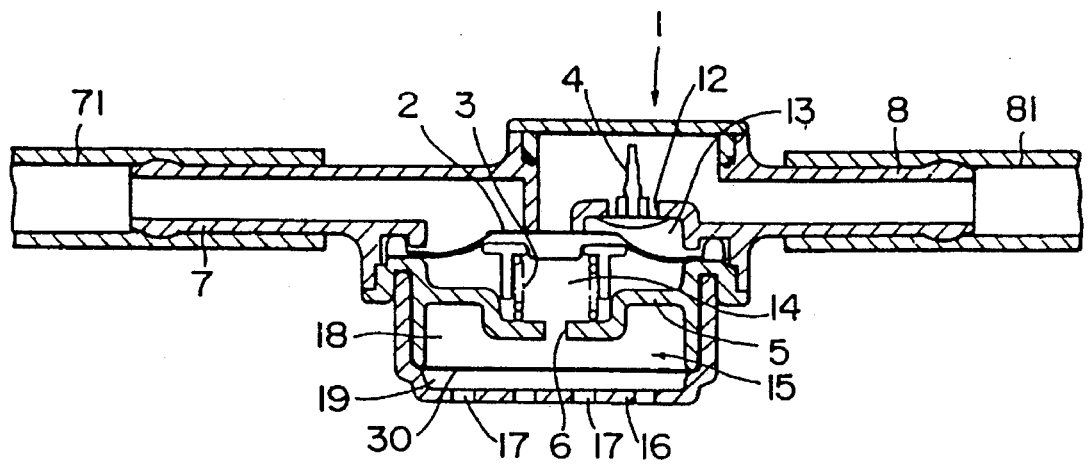
FIG. 7 is cross section showing the essential part of a negative pressure cut valve according to the fourth preferred embodiment of this invention.

Finally, the negative pressure cut valve 1 according to the fourth embodiment will be described in detail below with reference to FIG. 7. In this diagram, like component elements shown in the first embodiment will be denoted by like reference numerals and will be omitted from the following description.

Since the negative pressure cut valve 1 of the fourth embodiment basically adopts the construction of the first embodiment, it is so constructed that the second outer wall 16 is disposed in a watertight state around the periphery of the first atmospheric vent 6, that the second outer wall 16 and the first outer wall 5 define the empty space 15 for precluding intrusion of water, dirt, etc., that the capacity of the empty space 15 for precluding intrusion is set above the operating capacity of the diaphragm 2, and that the second atmospheric vents 17 endowed with a function of releasing pressure and a function of discharging water are formed in the bottom part of the second outer wall 16. The number of the second atmospheric vents 17 is four.

This negative pressure cut valve 1 is characterized in that a gas-liquid separating membrane 30 for separating the empty space 15 for precluding intrusion into the first empty space 18 on the first atmospheric vent 6 side and the second empty space 19 on the second atmospheric vent 17 side is disposed inside the empty space 15.

This gas-liquid separating membrane 30 is formed of such a material as commercially available article marketed in Japan under trademark designation of "Goretex" which passes and intercepts water.

In the fourth embodiment, therefore, when the diaphragm 2 is shifted from the shut state to the open state, the air held in the operating empty space 14 is discharged outside past the gas-liquid separating membrane 30 through the second atmospheric vent 17 in an amount proportionate to the amount of the shifting action of the diaphragm 2 under the positive pressure on the operating empty space 14 side and, at the same time, the gas-liquid separating membrane 30 is elastically deformed in the direction of the bottom of the second outer wall 16.

Conversely when the diaphragm 2 is shifted from the open state to the shut state, the ambient air is caused under the negative pressure on the operating empty space 14 side to flow past the gas-liquid separating membrane 30 toward the operating empty space 14 side in an amount proportionate to the shifting action of the diaphragm 2.

In the fourth embodiment, therefore, since the empty space 15 for precluding intrusion is separated by the gas-liquid separating membrane 30 into the first empty space 18 on the first atmospheric vent 6 side and the second empty space 19 on the second atmospheric vent 17 side, water, dirt, etc. which happen to enter the second empty space 19 are intercepted by the gas-liquid separating membrane 30 and hindered from entering the first empty space 18 in the same manner as in the second and third embodiments described above. Thus, the adhesion of the water, dirt, etc. to the diaphragm 2 and the compression coil spring 3 can be infallibly prevented and the otherwise possible defective operation of the diaphragm 2 can be eliminated without fail.

In the embodiments cited above, the respective negative pressure cut valves 1 are intended to be disposed in the vapor recovery system S shown in FIG. 8. Naturally, this invention need not be limited to this particular use but may be adapted for other proper system or mechanism.

The number of the second atmospheric vents 17 to be formed is two in the first embodiment, four in the second embodiment, two in the third embodiment, and four in the fourth embodiment. The numbers specified above need not be limited to the particular embodiments mentioned but may be suitably increased or decreased to suit such factors as design conditions.

Further, particularly the second through fourth embodiments do not have the inner vertical wall 5a owned by the first embodiment in consideration of the operation of the elastic member 20 or the gas-liquid separating membrane 30. They may be provided with a wall equivalent to the inner vertical wall 5a, depending on the relevant design conditions.

The other component elements, when necessary, may be suitably altered or modified without departing from the spirit of the invention.

Owing to the adoption of the construction described above, this invention allows the capacity of the empty space for precluding intrusion to be set above the operating capacity of the diaphragm. Even when water, dirt, etc. happen to enter the main body through the second atmospheric vents in the second outer wall, therefore, these extraneous substances are made to remain within the empty space for precluding intrusion and are hindered from entering the operating empty space of the diaphragm through the first atmospheric vent or exerting adverse effects on the performance of the valve aimed at. Thus, this invention allows infallible prevention of the adhesion of such extraneous substances to the diaphragm and the urging spring means.

Moreover, the extraneous substances which happen to enter the empty space for preclusion of intrusion are not suffered to remain inside the empty space for precluding intrusion but are discharged without fail through the second atmospheric vent on the second outer wall side when the difference of pressure ceases to exist.

In the case of the construction in which the empty space for precluding intrusion is separated by the elastic member or the gas-liquid separating membrane into the first empty space on the first atmospheric vent side and the second empty space on the second atmospheric vent side, the water, dirt, etc. which happen to enter the second empty space are intercepted by the elastic member or the gas-liquid separating membrane and hindered from entering the first empty space. Thus, this invention allows prevention of the adhesion of such extraneous substances to the diaphragm and the urging spring means with further exalted infallibility.

What is claimed is:

1. A negative pressure cut valve disposed between a feed pipe and a forward pipe and comprising:

a main body having a first outer wall and a second outer wall;

urging spring means provided on said first outer wall;

a diaphragm provided on said main body and actuated by a relative action of a force of said urging spring means and an inner pressure on a side of the feed pipe to produce an opening action in a state in which the inner pressure on the feed pipe side rises above an inner pressure on a side of the forward pipe and a closing action in other pressure state; and valve means provided on said main body and actuated to produce an opening action in a state in which the inner pressure on the feed pipe side falls below the inner pressure on the forward pipe side and a closing action in other pressure state;

said first outer wall having a first atmospheric vent formed therein;

said second outer wall being disposed around a periphery of said first atmospheric vent and enabled jointly with said first outer wall to define an empty space for precluding intrusion of extraneous substances;

said empty space having a capacity at least above an operating capacity of said diaphragm;

said second outer wall having a second atmospheric vent formed therein and endowed with a function of releasing pressure and a function of discharging water.

2. A negative pressure cut valve disposed between a feed pipe and a forward pipe and comprising:

a main body having a first outer wall having a first atmospheric vent formed therein and a second outer wall disposed around a periphery of said first atmospheric vent and enabled jointly with said first outer wall to define an empty space for precluding intrusion of extraneous substances, said second outer wall having a second atmospheric vent formed therein and endowed with a function of releasing pressure and a function of discharging water;

urging spring means provided on said first outer wall;

a diaphragm provided on said main body and actuated by a relative action of a force of said urging spring means and an inner pressure on a side of the feed pipe to produce an opening action in a state in which the inner pressure on the feed pipe side rises above an inner pressure on a side of the forward pipe and a closing action in other pressure state;

valve means provided on said main body and actuated to produce an opening action in a state in which the inner pressure on the feed pipe side falls below the inner pressure on the forward pipe side and a closing action in other pressure state;

said empty space having a capacity at least above an operating capacity of said diaphragm; and an elastically deformable elastic member disposed inside said empty space for dividing said empty space into a first empty space on the first atmospheric vent side and a second empty space on the second atmospheric vent side.

3. A negative pressure cut valve according to claim 2, wherein said elastically deformable elastic member is formed of rubber, soft resin made of vinyl chloride or polyethylene, coated non-woven fabric, or elastomer.

4. A negative pressure cut valve according to claim 2, wherein said elastically deformable elastic member is formed into a membrane.

5. A negative pressure cut valve according to claim 3, wherein said elastically deformable elastic member is formed into a membrane.

6. A negative pressure cut valve according to claim 2, wherein said elastically deformable elastic member is formed into a bellows.

7. A negative pressure cut valve according to claim 3, wherein said elastically deformable elastic member is formed into a bellows.

8. A negative pressure cut valve disposed between a feed pipe and a forward pipe and comprising:

a main body having a first outer wall having a first atmospheric vent formed therein and a second outer wall disposed around a periphery of said first atmospheric vent and enabled jointly with said first outer wall to define an empty space for precluding intrusion of extraneous substances, said second outer wall having a second atmospheric vent formed therein and endowed with a function of releasing pressure and a function of discharging water;

urging spring means provided on said first outer wall;

a diaphragm provided on said main body and actuated by a relative action of a force of said urging spring means and an inner pressure on a side of the feed pipe to produce an opening action in a state in which the inner pressure on the feed pipe side rises above an inner pressure on a side of the forward pipe and a closing action in other pressure state;

valve means provided on said main body and actuated to produce an opening action in a state in which the inner pressure on the feed pipe side falls below the inner pressure on the forward pipe side and a closing action in other pressure state;

said empty space having a capacity at least above an operating capacity of said diaphragm; and a gas-liquid separating membrane disposed inside said empty space for dividing said empty space into a first empty space on the first atmospheric vent side and a second empty space on the second atmospheric vent side.

9. A negative pressure cut valve according to claim 1, wherein it is arranged on a piping extending between a fuel tank and a canister of an automobile.

10. A negative pressure cut valve according to claim 2, wherein it is arranged on a piping extending between a fuel tank and a canister of an automobile.

11. A negative pressure cut valve according to claim 8, wherein it is arranged on a piping extending between a fuel tank and a canister of an automobile.

12. A negative pressure cut valve according to claim 9, wherein it is used in a leakproof system for vaporized fuel in an automobile fuel tank and arranged, in parallel to a bypass valve, on the piping extending from the fuel tank via an evaporation shutting valve to the canister.

13. A negative pressure cut valve according to claim 10, wherein it is used in a leakproof system for vaporized fuel in an automobile fuel tank and arranged, in parallel to a bypass valve, on the piping extending from the fuel tank via an evaporation shutting valve to the canister.

14. A negative pressure cut valve according to claim 11, wherein it is used in a leakproof system for vaporized fuel in an automobile fuel tank and arranged, in parallel to a bypass valve, on the piping extending from the fuel tank via an evaporation shutting valve to the canister.

* * * * *